US012717885B2

(12) United States Patent
Crabtree et al.

(10) Patent No.: US 12,717,885 B2
(45) Date of Patent: Aug. 25, 2026

(54) MULTI-FACTOR AUTHENTICATION KIOSK

(71) Applicant: QOMPLX LLC, Reston, VA (US)

(72) Inventors: Jason Crabtree, Vienna, VA (US); Richard Kelley, Woodbridge, VA (US); David Park, Fairfax, VA (US); Jason Hopper, Halifax (CA)

(73) Assignee: QOMPLX LLC, Reston, VA (US)

( * ) Notice: Subject to any disclaimer, the term of this patent is extended or adjusted under 35 U.S.C. 154(b) by 99 days.

(21) Appl. No.: 18/665,556

(22) Filed: May 15, 2024

(65) Prior Publication Data

US 2025/0355982 A1 Nov. 20, 2025

(51) Int. Cl.
*G06F 21/32* (2013.01)

(52) U.S. Cl.
CPC .................................... *G06F 21/32* (2013.01)

(58) Field of Classification Search
CPC ....................................................... G06F 21/32
See application file for complete search history.

(56) References Cited

U.S. PATENT DOCUMENTS 9,323,912 B2 * 4/2016 Schultz .................. G06F 21/32
10,305,895 B2 * 5/2019 Barry ..................... G07C 9/257
11,069,167 B2 * 7/2021 Einberg ............. G07C 9/00571
11,217,051 B2 * 1/2022 Masood ................. G07C 9/257
2016/0180068 A1 * 6/2016 Das ..................... H04L 63/0861
726/7
2025/0112918 A1 * 4/2025 Gapakov ............... H04L 63/108

* cited by examiner

*Primary Examiner* — Pramila Parthasarathy
(74) *Attorney, Agent, or Firm* — NK Patent Law

(57) ABSTRACT

The provided system and methods describe a Multi-factor Authentication (MFA) kiosk that utilizes various sensors to capture biometric, behavioral, and physiological data for authentication. The kiosk includes a user interface, a set of sensors, and services such as kiosk management, rules configuration, sensor management, and an authentication service. The sensors, both integrated and external, gather diverse data, including facial recognition, fingerprint scans, voice recognition, gait analysis, and more, constructing a physical profile for authentication. The system incorporates a rules service for configuring authentication policies and a sensor management service to optimize sensor performance. Authentication service uses a scoring model, potentially a deep learning algorithm like an autoencoder, to generate an authentication score based on inputs from sensors, rules, and previous attempts. Security measures include encryption, isolation of components, and compliance with data protection regulations. A plurality of MFA kiosks may form an authentication network.

38 Claims, 11 Drawing Sheets

An individual interacts with a multi-factor authentication kiosk
801

Capture a plurality of biometric and behavioral data of the individual from one or more sensors
802

Compare the captured biometric and behavioral to a plurality of biometric factors stored in a physical profile associated with the individual
803

Compare the captured biometric and behavioral data to additional biometric factors stored in the physical profile associated with the individual
806

800

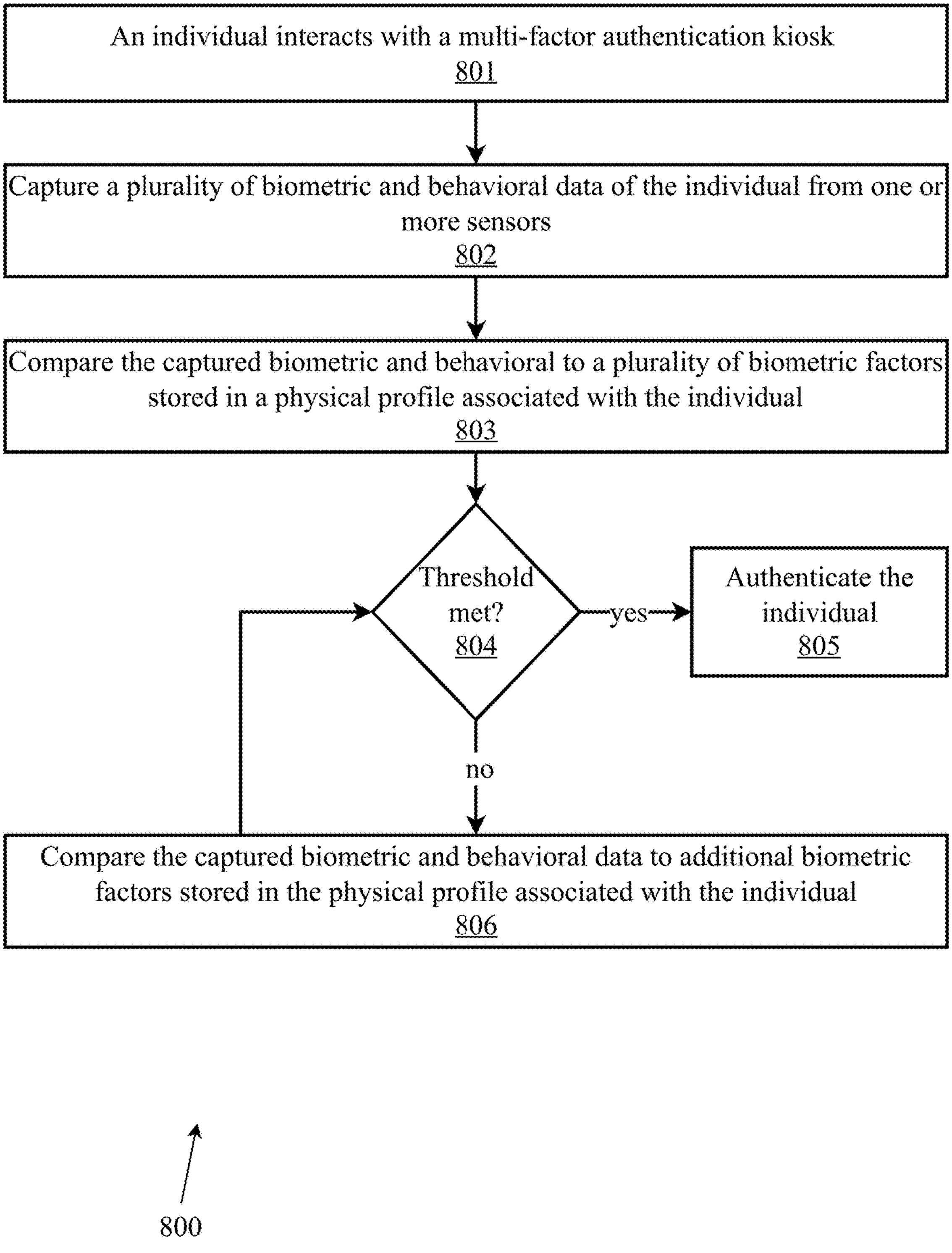

FIG. 8

Obtain sensor state information, authentication state information, and authentication rules and policies
1001

Use the obtained data as input data for a scoring model
1002

Process the input data using the scoring model to generate an authentication score
1003

Authentication Sufficient?
1004 no

Alert user
1005 yes

Perform multi-factor authentication
1006

1000

MULTI-FACTOR AUTHENTICATION KIOSK

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of access security, and more particularly to multi-factor authentication with a verified physical profile.

Discussion of the State of the Art

Today's credential-based attacks are much more sophisticated. Whether it's advanced phishing techniques, credential stuffing, or even credentials compromised through social engineering or breaches of a third-party service, credentials are easily the most vulnerable point in defending systems. All these attacks key on traditional credentials, usernames and passwords, which are reliably less useful as a legitimate security measure.

As passkeys, password managers, multi-factor authentication, biometrics and behavior, and device fingerprinting continue to see additional adoption in the interest of both security and ease of consumer experience, it is increasingly imperative that an individual (e.g., human, robot, or artificial intelligence) and their physical, digital, and legal personas are able to be authenticated. Since authentication remains the central assumption, both that it is possible and that it is accurately completed, of today's increasingly tech-enabled world, it is important to ensure timely, contextual, and well placed authentication service technologies. The most effective way forward in enhancing access security is implementing multi-factor authentication (MFA).

What is needed is multi-factor authentication using a purpose-built kiosk configured to construct a physical profile linked to an individual for comparison during authentication events.

SUMMARY OF THE INVENTION

Accordingly, the inventor has conceived and reduced to practice, a multi-factor authentication kiosk that utilizes various sensors to capture biometric, behavioral, and physiological data for authentication. The kiosk includes a user interface, a set of sensors, and services such as kiosk management, rules configuration, sensor management, and an authentication service. The sensors, both integrated and external, gather diverse data, including facial recognition, fingerprint scans, voice recognition, gait analysis, and more, constructing a physical profile for authentication. The system incorporates a rules service for configuring authentication policies and a sensor management service to optimize sensor performance. Authentication service uses a scoring model, potentially a deep learning algorithm like an autoencoder, to generate an authentication score based on inputs from sensors, rules, and previous attempts. Security measures include encryption, isolation of components, and compliance with data protection regulations. A plurality of MFA kiosks may form an authentication network.

According to a preferred embodiment, a computing system for multi-factor authentication with physical profiles employing a kiosk is disclosed, the computing system comprising: one or more hardware processors configured for: receiving a plurality of biometric and behavioral data associated with an individual from one or more sensors; constructing a physical profile associated with the individual, wherein the physical profile comprises one or more biometric templates; storing the physical profile of the individual in a database; and performing multi-factor authentication of the individual by selecting one or more of the biometric templates to be used as one or more authentication factors.

According to another preferred embodiment, a computer-implemented method executed on a kiosk for multi-factor authentication with physical profiles is disclosed, the computer-implemented method comprising: receiving a plurality of biometric and behavioral data associated with an individual from one or more sensors; constructing a physical profile associated with the individual, wherein the physical profile comprises one or more biometric templates; storing the physical profile of the individual in a database; and performing multi-factor authentication of the individual by selecting one or more of the biometric templates to be used as one or more authentication factors.

According to another preferred embodiment, a system for multi-factor authentication with physical profiles employing a kiosk is disclosed, comprising one or more computers with executable instructions that, when executed, cause the system to: receive a plurality of biometric and behavioral data associated with an individual from one or more sensors; construct a physical profile associated with the individual, wherein the physical profile comprises one or more biometric templates; store the physical profile of the individual in a database; and perform multi-factor authentication of the individual by selecting one or more of the biometric templates to be used as one or more authentication factors According to another preferred embodiment, non-transitory, computer-readable storage media having computer-executable instructions embodied thereon that, when executed by one or more processors of a computing system employing a kiosk for multi-factor authentication with physical profiles, cause the computing system to: receive a plurality of biometric and behavioral data associated with an individual from one or more sensors; construct a physical profile associated with the individual, wherein the physical profile comprises one or more biometric templates; store the physical profile of the individual in a database; and perform multi-factor authentication of the individual by selecting one or more of the biometric templates to be used as one or more authentication factors.

According to an aspect of an embodiment, the selecting one or more biometric templates is based on one or more authentication rules or policies.

According to an aspect of an embodiment, further comprising the steps of: obtaining sensor state information from the one or more sensors; using the sensor state information as an input to a scoring model to generate an authentication score indicating if the kiosk can provide sufficient authentication; and performing multi-factor authentication of the individual based on the authentication score.

According to an aspect of an embodiment, the scoring model is a trained neural network.

According to an aspect of an embodiment, authentication state information and authentication rules are used as additional inputs to the scoring model to generate the authentication score.

According to an aspect of an embodiment, further comprising the steps of: obtaining a second plurality of biometric and behavioral data from the one or more sensors; and comparing the second plurality of biometric and behavioral data with stored physical profile to identify one or more matching biometric templates to be used as the authentication factors to perform the multi-factor authentication.

According to an aspect of an embodiment, the kiosk is an immersive kiosk.

According to an aspect of an embodiment, the kiosk is a non-immersive kiosk.

According to an aspect of an embodiment, the one or more sensors comprise biometric sensors.

According to an aspect of an embodiment, the one or more biometric templates comprise a surgical debris, retina template, and brainwave pattern.

BRIEF DESCRIPTION OF THE DRAWING FIGURES

FIG. 8 is a flow diagram illustrating an exemplary method for providing multi-factor authentication to an individual using an MFA kiosk with an authentication threshold, according to an embodiment.

DETAILED DESCRIPTION OF THE INVENTION

Figure 1:
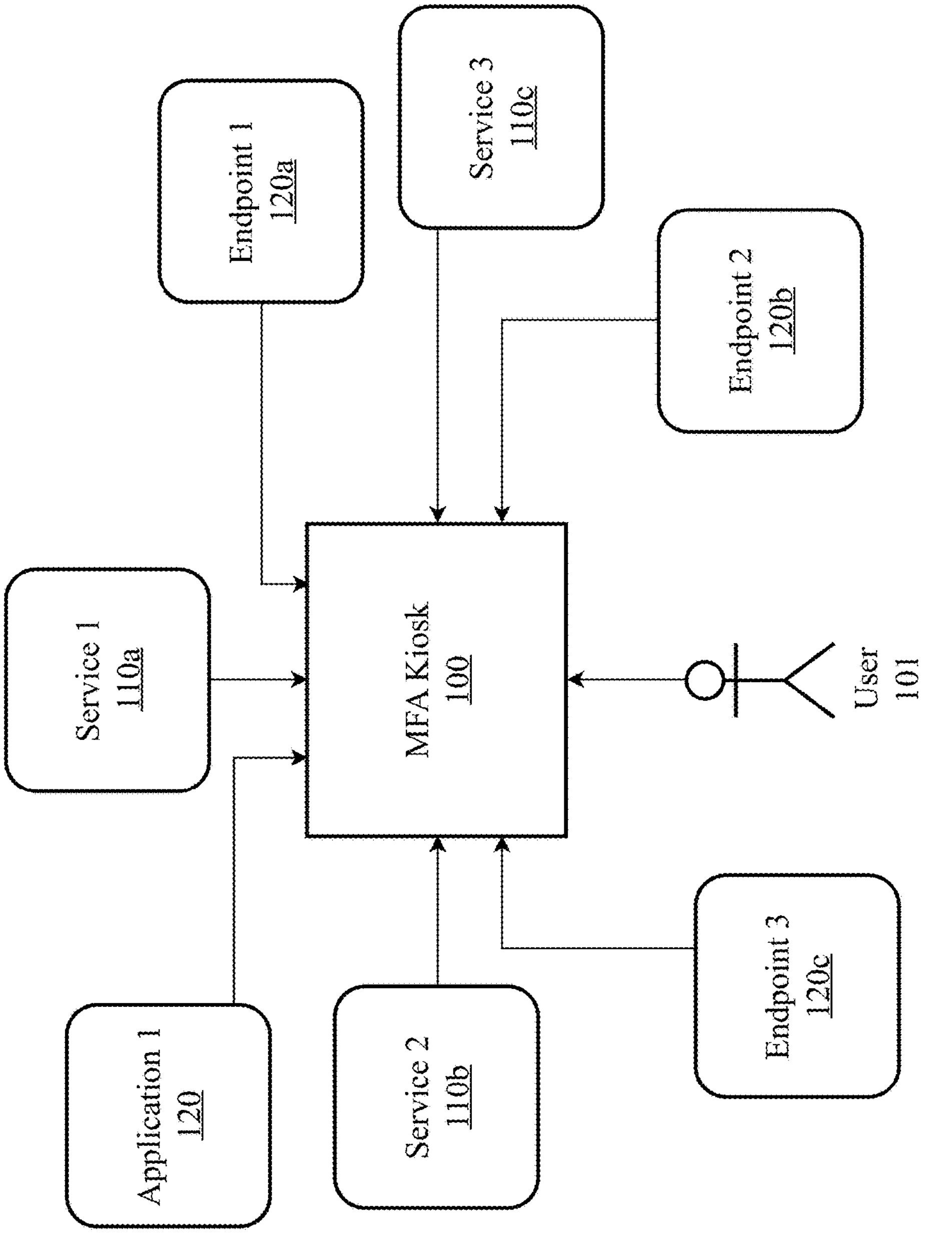
FIG. 1 is a block diagram illustrating an exemplary system architecture for a multi-factor authentication kiosk, according to an embodiment.

The inventor has conceived, and reduced to practice, a multi-factor authentication kiosk that utilizes various sensors to capture biometric, behavioral, and physiological data for authentication. The kiosk includes a user interface, a set of sensors, and services such as kiosk management, rules configuration, sensor management, and an authentication service. The sensors, both integrated and external, gather diverse data, including facial recognition, fingerprint scans, voice recognition, gait analysis, and more, constructing a physical profile for authentication. The system incorporates a rules service for configuring authentication policies and a sensor management service to optimize sensor performance. Authentication service uses a scoring model, potentially a deep learning algorithm like an autoencoder, to generate an authentication score based on inputs from sensors, rules, and previous attempts. Security measures include encryption, isolation of components, and compliance with data protection regulations. A plurality of MFA kiosks may form an authentication network.

According to some embodiments, the kiosk may optionally have the ability to include device profiling and testing equipment (e.g., CPU/memory) and other diagnostics that can support "transfer" transactions. This can improve legitimate trade-ins, transfers, etc. of phones and devices while also helping to guard against direct device theft issues.

According to some use cases, a kiosk network provides the ability to link a person to a physical profile for sufficient onboarding in medical and employment issues. Fake worker onboarding, insurance abuse, etc., can all be significantly reduced if such profiles are available. Auto theft with "whole body profiles" could likewise leverage a broader host of data for digital sale/transfer, authorized rental/temporary borrowing, and general safety.

Other practical examples of use cases for an MFA kiosk are numerous an can include, but are not limited to: (a) transferring ownership of a mobile device (be it a watch, car, scooter, augmented reality (AR) device, phone, etc.): (b) opening or emptying a financial account (including loan applications); (c) engaging in meaningful legal obligations (e.g., marriage, a criminal plea, guardianship, divorce, social security, home mortgage closings, etc.); (d) major exams (e.g., bar exam, professional engineer, series 7 license, etc.) where great harm to the public can occur with illicit resulting licensure/qualification.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for a multi-factor authentication (MFA) kiosk, according to an embodiment. According to the embodiment, a plurality of federated applications, services, and corporate/organizational domains may construct "trusted authentication" kiosks which can be placed in a variety of locations. These kiosks might be organizationally owned and operated (e.g., by a corporate entity) or could be independently operated (e.g., similar to ATM [automated teller machine] networks). According to the embodiment, a multi-factor authentication kiosk 100 may connect provide multi-factor authentication of a user 101 to allow access to various services 110*a-n*, applications 130, and endpoints 120*a-n*.

According to the embodiment, the user may be any individual human and MFA kiosk 100 can provide authentication for their physical, digital, and/or legal personas. In some embodiments, it is envisioned that a user may be a robot, artificial intelligence, or some combination thereof. In various embodiments, services 110*a-n* may be construed in the context of software and system architecture, wherein "services" generally refer to self-contained, modular, and independent components that perform specific functions or tasks with a larger system. Services 110*a-n* can communicate with each other to achieve a higher-level goal or provide a complete transaction. In some implementations, services 110*a-n* may comprise one or more microservices which may communicate with each other and/or MFA kiosk 100 via well-defined application programming interfaces (APIs). Authentication is necessary to ensure that only authorized users or services can access specific functionalities or data.

Endpoints 120*a-n* may refer to a plurality of devices, systems, applications, or physical locations which require user authentication for access to the endpoint. For example, endpoint devices may include, but are not limited to, mobile devices, devices provided by an employer to an employee, personal computers, workstations, tablets, medical equipment, smart devices, IoT devices, sensors, switches, routers, servers, printers, and/or other networked devices. Examples of endpoint physical locations may include, but are not limited to, medical facilities, exercise facilities, corporate facilities, military facilities, and/or the like. A physical location may also comprise a locker, safe, storage box, or some other type of container with a locking mechanism or some other means for restricting access to itself. For example, a short-term rental house may utilize a secure key storage that can be configured to release the key to a renter upon user authentication by MFA kiosk. As another example, kiosk could be used to control access to an endpoint related to controlled substance access (e.g., at a hospital or potentially in an at home drug dispenser or "robo-pharmacy") or some other pharmaceutical process.

According to the embodiment, the multi-factor authentication kiosk 100 may connect to and communicate with the various applications, services, and/or endpoints over a suitable communication network such as, for example, the Internet. Various other communication networks may be utilized and the choice of communication network may be dependent upon the use case or other aspect of an embodiment. For example, MFA kiosk 100 may utilize a short-range wireless communication technology designed for exchanging data between devices (e.g., Bluetooth) to perform various tasks related to authentication of an individual and/or device such as by establishing a short-range wireless connection with a user device for the purpose of obtaining device data (e.g., device identifier, device location, device software/hardware data, etc.), user data (e.g., user location, user phone number, user handle, user email address, user biometric data, etc.), application data, and other data that may be useful for authenticating a user and/or a device.

In yet another embodiment, MFA kiosk 100 may utilize Radio-Frequency Identification (RFID) technology to perform various tasks related to authentication of an individual and/or device. For example, MFA kiosk 100 may comprise an RFID reader configured to communicate with RFID tags and collect data. When an RFID tag comes into range of an RFID reader, the reader sends a signal that activates the tag. The tag responds by transmitting its data to the reader. This data might include unique identification information which may be used as part of an authentication process.

According to the embodiment, the multi-factor authentication kiosk 100 may connect to and communicate with the various applications, services, and/or endpoints over a suitable communication network such as, for example, a local network (wired or wireless). A local network, whether wired or wireless, is a collection of connected devices that can communicate with each other within a limited geographical area, such as a home, office, or campus. These networks facilitate the sharing of resources, information, and services among connected devices. In a wired local network, various networked devices/endpoints and MFA kiosk 100 may connect to a local network via an Ethernet cable plugged into an Ethernet port on the device/endpoint/MFA kiosk 100 and may communicate via Ethernet protocols and TCP/IP protocols. In a wireless local network, wireless-enabled devices/endpoints and MFA kiosk 100 may connect to a wireless network via a wireless access point (e.g., wireless router) and may communicate using various Wi-Fi standard protocols (e.g., 802.11a, 802.11b, 802.11ac, etc.).

In some embodiments, MFA kiosk 100 may be implemented as one or more computing devices comprising one or more hardware processors configured to perform the various methods and processes associated with authentication described herein. In some embodiments, MFA kiosk 100 may be implemented as a purpose-built computing system comprising at least a processor and a memory, wherein a plurality of computer-readable instructions may be stored in the memory and executable by the processor cause the purpose-built computing system to perform the various methods and processes associated with authentication described herein.

In addition to processors and memory, MFA kiosk 100 may further comprise each of the following depending upon the embodiment: a display for displaying various data associated with authentication processes via a user interface (e.g., graphic user interface), a network interface (e.g., network interface card or a software-based implementation), devices for providing input to the kiosk (e.g., keyboard, mouse, keypad, button, slider, switch, touchpad, controller, etc.), one or more cameras for capturing images and/or video, one or more microphones for capturing audio data (e.g., user speech and utterances), one or more sensors for capturing a plurality of data (e.g., biometric sensors, pressure sensors, x-ray sensor, light sensors, etc.), and one or more transducers for transforming electrical signals into various stimulation outputs. Biometric sensors may include, but are not limited to, fingerprint sensors, facial recognition cameras (e.g., cameras equipped with facial recognition technology capture and analyze facial features as a factor for multi-factor authentication), iris scanners (e.g., capture the unique patterns in the iris of the eye for identity verification), voice recognition microphones (e.g., voice recognition sensors analyze unique vocal patterns as a factor for multi-factor authentication), palm vein scanners (e.g., scanners that use near-infrared light to capture the vein pattern beneath eh skin of the palm for biometric identification), heart rate monitors, and behavioral biometrics (e.g., accelerometers and gyroscopes to analyze unique patterns in how a user interacts with their device or a kiosk, such as typing style or walking gait). It should be appreciated that each of these components and sensors may be integrated into MFA kiosk in a unified structure (e.g., like, for example, a photo booth) or may be implemented separate from MFA kiosk (e.g., cameras, gait sensors, heat sensors, elector magnetic sensors, etc., in a lobby of a bank or at a transit hub/chokepoint or retail center), but still communicatively coupled such that the components/sensors and the kiosk may be able to transmit/receive data and instructions to facilitate user and/or device authentication.

According to some embodiments, MFA kiosk 100 provides multi-factor authentication of a user by constructing a physical profile of the user which can be used as a factor in a multi-factor authentication scheme. A physical profile of a user may be created after a user's initial interaction with MFA kiosk 100. Various sensor/biometric data of the user is collected by MFA kiosk to create the physical profile. In some implementations, sensor/biometric data of the user may comprise one or more cranial measurements commonly used in facial recognition, ancillary features (e.g., beards, wigs, hair, brows, etc.), as well as potentially other medical related issues (e.g., fillings or crowns) that can be sensed. In at least one embodiment, x-rays (e.g., panoramic or sinus) can be used at times when need to diagnostically or to compensate for other authentication scoring issues/deficiencies when amassing (authentication) evidence in the aggregate. It should be appreciated that the kiosk need not focus solely on the head. In various implementations, the system may be used for whole body authentication and can go beyond liveliness (basic movements) and can require specific activities (e.g., a jumping-jack or a normal walk, a sequence). In some instances, sedentary versus athletic movement may in fact be needed to ascertain data necessary for downstream uses. It should be further appreciated that the physical profile constructed could also include indicators such as body fat, muscle composition, joint or bone enhancements (e.g., plates, screws, false joints, missing organs, etc. associated with prior surgical procedures).

Figure 2:
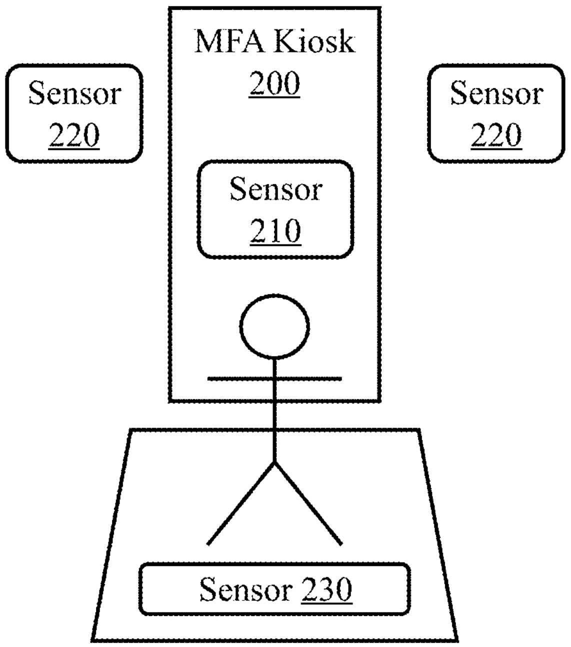
FIG. 2 is a block diagram illustrating an exemplary embodiment of a MFA kiosk deployed at a physical location for authentication of a user.

FIG. 2 is a block diagram illustrating an exemplary embodiment of a MFA kiosk deployed at a physical location for authentication of a user. According to the embodiment, the MFA kiosk 200 is deployed at a physical location such as at an airport, bank, sports venue, medical facility, research facility, military facility, corporate office, and/or the like. MFA kiosk 200 may comprise one or more onboard sensors 210 integrated into the structure of the MFA kiosk and configured to capture, measure, and transmit various physical, biometric, physiological, and/or attributes of the user 205 in order to facilitate user authentication. Additionally, or alternatively, one or more sensors 220 may be present surrounding and not necessarily integrated into the structure of the kiosk, but still communicatively coupled with the kiosk via a suitable network connection and able to transmit various physical, biometric, physiological, and/or attributes of the user 205 in order to facilitate user authentication. For example, the MFA kiosk may be placed in the lobby of a bank and may be able to receive video data from one or more cameras placed in the lobby of the bank. As another example, MFA kiosk 200 may utilize integrated microphones to enable voice recognition or could even integrate a fingerprint/handprint sensors to analyze palm prints, fingerprints, and/or hand geometry to facilitate authentication.

In this embodiment, MFA kiosk 200 includes at least one sensor on a surface in front of the kiosk, the at least one sensor able to provide authentication data. For example, one or more pressure sensors may be deployed in a surface in front of MFA kiosk so that when a kiosk user steps in front of the kiosk to facilitate authentication by capturing data related to the user's gait or walking pattern. The surface may be a purpose built surface with embedded sensors. For example, the surface could be a pad made from vinyl with one or more sensor arrays embedded therein.

A kiosk user can stand in front of MFA kiosk 200 to facilitate authentication. If it's the individual's first time using an MFA kiosk 200 then the kiosk may use the plurality of sensors 210, 220, and 230 to capture a plurality of physical, biometric, physiological data associated with the individual to create a physical profile of the user which can be used as a factor in a multi-factor authentication process. Additionally, MFA kiosk 200 may also capture device data associated with the individual's mobile device in order to link the mobile device with individual and their physical profile. In some embodiments, during an initial interaction with MFA kiosk 200, the user may be asked to provide other types of information including, but not limited to, user demographics, user contact information (e.g., email address, social media handle, phone number, physical address, etc.), and information that could be used identify or otherwise verify the user. In some embodiments, during an initial authentication event of an individual the kiosk may prompt the user to perform one or more specific physical actions as part of the data capture process for constructing the physical profile of the individual. For example, the kiosk could prompt (e.g., voice or text-based prompt or both) the user to touch a series of body parts (e.g., head, shoulders, knees, and toes) to create physical movement that can be included as a component of the physical profile.

In operation, when it is not an individual's first time using an MFA kiosk 200 then the kiosk uses the plurality of sensors 210, 220, and 230 to capture a plurality of physical, biometric, and physiological data associated with the individual, perform various processing of the data thereof, and compare the processed data to the stored physical profiles to identify/verify the individual as a factor for multi-factor authentication. It should be appreciated that multiple sensors may be capturing and transmitting data about a kiosk user simultaneously via one or more data streams (or in batches), and that the processing of multiple data streams can be performed simultaneously as well. For example, a user may be asked to type on a keyboard integrated into or connected to the kiosk and the kiosk can simultaneously capture key stroke data and video data captured by a camera on the kiosk to analyze both the user's unique typing pattern and facial data. As another example, a microphone can capture a user's spoken pass phrase or other utterance while one or more cameras and/or one or more pressure sensors also capture the user's unique gait or walking pattern, and both sets of data are used to compare against stored physical profiles to authenticate the user.

The type of arrangement illustrated in this embodiment wherein the user has to stand in front of MFA kiosk 200 may be referred to as a non-immersive embodiment. Another type of non-immersive embodiment may be implemented wherein the user is not required to step in front of the kiosk. For example, cameras could film an individual walking through an x-ray machine while a MFA kiosk receives the video data and x-ray imaging data to perform gait analysis and physical augmentation analysis to compare the individuals gait and possible surgical hardware embedded in their body to stored physical profiles to perform an authentication step for multi-factor authentication. In such an embodiment, the individual need not interact with a kiosk directly as this may be done passively as the individual moves through a location such as a checkpoint at a hospital or sports venue.

In an embodiment, MFA kiosk may be implemented as a micro-kiosk. Examples of micro-kiosks can include a desktop or laptop being used for trading, mobile device used for biometrics in addition to possible computer biometrics, or a separate sensor device that can be placed on desktop (e.g., microphones for ambient noise detection and analysis, independent voiceprint identification, and/or to confirm no one else is present; cameras for additional biometric verification; accelerometers for detecting tampering/movement of devices; and/or pairing with verified computer and mobile devices, etc.).

In some embodiments, MFA kiosk may be integrated with existing systems. For example, an ATM can be integrated with a MFA kiosk to provide richer user authentication for more advanced banking options and financial transaction management (e.g., stock trading, deposits, account openings, cross border money transfers, wires, etc.).

Since a kiosk may optionally include a desk or workspace, MFA kiosk can add value to remote employment activities with sensitive data or other access elements. An existing space (e.g., conference room or office) could be configured as a kiosk with sufficient sensor coverage/density. Kiosks may be rated/scored based on both their completeness of sensor coverage, ability to monito the sensor integrity/audit of all digital and physical interaction with said sensors and data storage/transmission to the overall system/network, and the ongoing accuracy of verifications of sensors in part and in aggregate (e.g., recertification or periodic verification of both accurate and precise values). Scores may be adjusted for accuracy or precision concerns linked to overall score and profile uncertainty in each "kiosk visit". In some embodiment, the system may include comparisons of visits and scores across direct measurements, factors, computed scores, or groups of factors or measurements of models. This may be at the personal level or other levels (e.g., all users of a given kiosk) to address accuracy, precision, security, audit, verification, or maintenance/optimization concerns. The resulting individual scores or profiles may direct the system to inform a user that a given kiosk is sufficient or insufficient to complete a given task given the context, timing, and place of a user and the actions seeking to be authorized. It should be appreciated that micro-kiosk can be used and combined with other readings. For example, in a hospital setting where someone may have been admitted and thoroughly documented/verified on intake and then has ongoing records of continued treatment that could be used as elements of evidence for the authentication process and therefor enable a high score to use fewer scoring support elements in subsequent verification processes (e.g., approving a surgical procedure). It should be further appreciated that the system can record various indicators which can include active medications or biofeedback signals (e.g., breath rate, pulse, blood oxygen, brainwaves, etc.) can also help establish the conditions under which a major decision/approval was given. This could substantially improve current issues with areas like medical malpractice and consent with are plagued by "regret" based reinterpretation or preoperative consent and information when outcomes do not occur as desired. This can improve healthcare outcomes and costs by ensuring accurate recordation of consents to protect patrons and protecting against overzealous plaintiffs seeking to abuse legal processes when known risks manifest. Similarly, a "kiosk scan" prior to an airline pilot boarding and taking control of several hundred patrons or a surgeon prior to final cleanup before surgery can create powerful disincentives for misconduct and protect consumers reliant on their professional state and ability.

Figure 3:
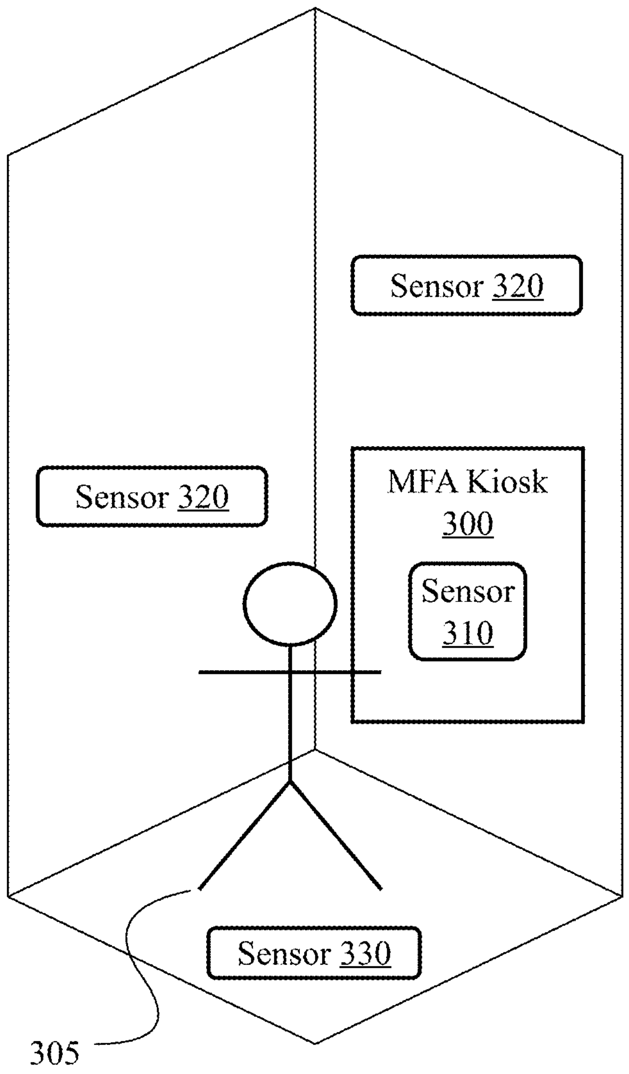
FIG. 3 is a diagram illustrating an exemplary embodiment of an MFA kiosk configured for immersive authentication.

FIG. 3 is a diagram illustrating an exemplary embodiment of an MFA kiosk configured for immersive authentication. According to the embodiment, an MFA kiosk 300 may be configured to provide immersive authentication wherein the individual seeking authentication may step into the kiosk to complete an authentication transaction. In certain embodiments, an immersive MFA kiosk may comprise an fully enclosed space (e.g., a photobooth or phone booth type of arrangement). In certain other embodiments, an immersive MFA kiosk may comprise a partially enclosed space (e.g., a cubicle type of arrangement). It should be appreciated that no matter the arrangement, a plurality of sensor may be deployed on any suitable surface of the kiosk such as on/in a surface on the floor as shown with sensor 330, on/in the surface of the wall as shown with sensors 320, on/in the surface of the ceiling, and hanging or otherwise suspended from any of these surfaces.

According to the embodiment, the MFA kiosk 300 is deployed at a physical location such as at an airport, bank, sports venue, medical facility, research facility, military facility, corporate office, and/or the like. MFA kiosk 300 may comprise one or more onboard sensors 310 integrated into the structure of the MFA kiosk and configured to capture, measure, and transmit various physical, biometric, physiological, and/or attributes of the user 305 in order to facilitate user authentication. Additionally, or alternatively, one or more sensors 320 may be present and surrounding the kiosk and communicatively coupled with the kiosk via a suitable network connection and able to transmit various physical, biometric, physiological, and/or attributes of the user 305 in order to facilitate user authentication.

In this embodiment, MFA kiosk 300 includes at least one sensor on a surface on the ground in front of the kiosk, the at least one sensor able to provide authentication data. For example, one or more pressure sensors may be deployed in a surface in front of MFA kiosk so that when a kiosk user steps in front of the kiosk to facilitate authentication by capturing data related to the user's gait or walking pattern. The surface may be a purpose built surface with embedded sensors. For example, the surface could be a pad made from vinyl (or plastic or any other suitable material) with one or more sensor arrays embedded therein.

A kiosk user can stand inside of immersive MFA kiosk 300 to facilitate authentication. If it's the individual's first time using an MFA kiosk 300 then the kiosk may use the plurality of sensors 310, 320, and 330 to capture a plurality of physical, biometric, behavioral, and physiological data associated with the individual to create a physical profile of the user which can be used as a factor in a multi-factor authentication process. Additionally, MFA kiosk 300 may also capture device data associated with the individual's mobile device in order to link the mobile device with individual and their physical profile. In some embodiments, during an initial interaction with MFA kiosk 300, the user may be asked to provide other types of information including, but not limited to, user demographics, user secrets (e.g., password, pin, or key), general user knowledge (e.g., historical addresses, mother's maiden name, favorite food, etc.), user contact information (e.g., email address, social media handle, phone number, physical address, etc.), and any other information that could be used identify or otherwise verify the user. In some embodiments, during an initial authentication event of an individual the kiosk may prompt the user to perform one or more specific physical actions as part of the data capture process for constructing the physical profile of the individual. For example, the kiosk could prompt (e.g., voice or text-based prompt or both) the user to touch a series of body parts (e.g., head, shoulders, knees, and toes) to create physical movement that can be included as a component of the physical profile.

In operation, when it is not an individual's first time using MFA kiosk 300 then the kiosk uses the plurality of sensors 310, 320, and 330 to capture a plurality of physical, biometric, and physiological data associated with the individual, perform various processing of the data thereof, and compare the processed data to the stored physical profiles to identify/verify the individual as a factor for multi-factor authentication.

Figure 4:
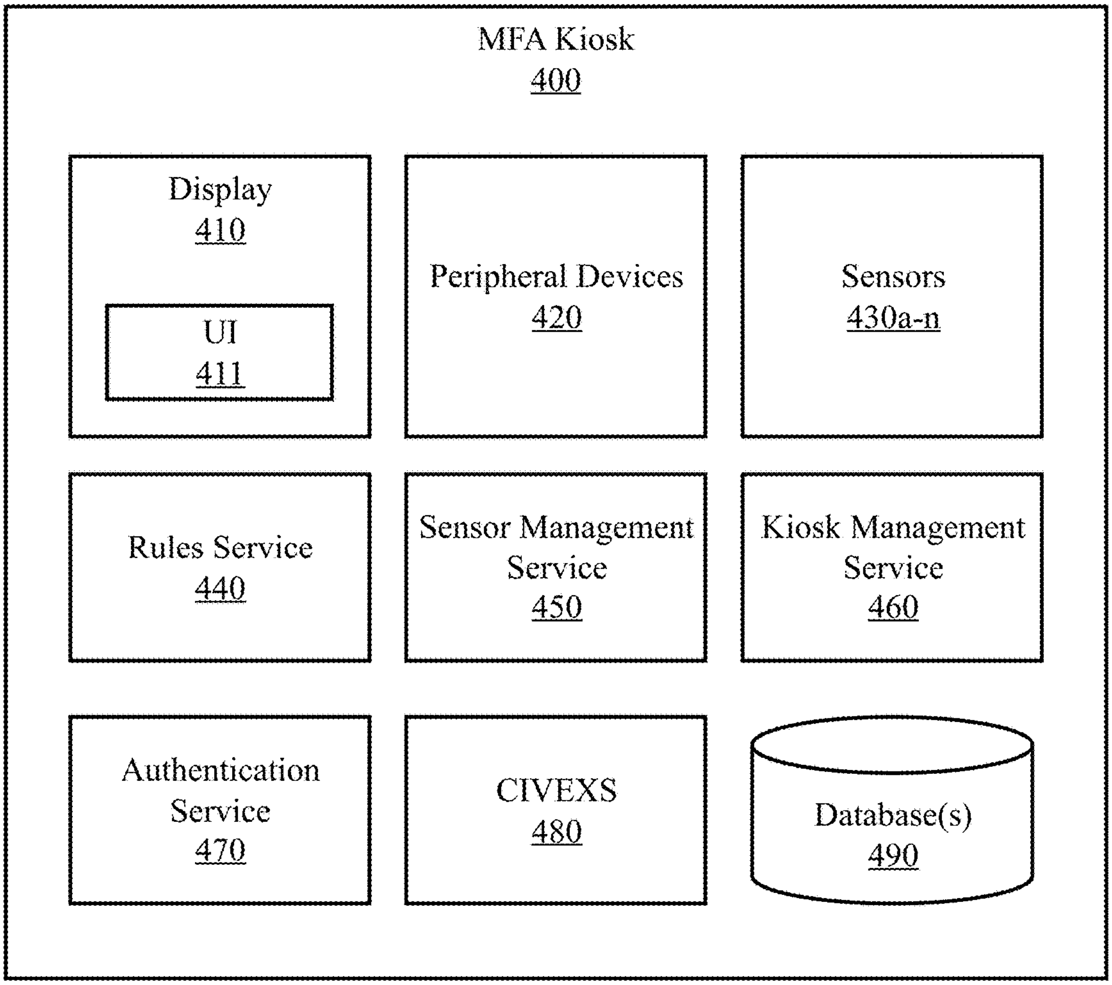
FIG. 4 is a block diagram illustrating an exemplary embodiment of a multi-factor authentication kiosk.

FIG. 4 is a block diagram illustrating an exemplary embodiment of a multi-factor authentication kiosk. According to some embodiments, MFA kiosk 400 may be implemented as a computing system employing an MFA kiosk, the computing system comprising one or more hardware processors configured for executing the various methods and processes related to the authentication of an individual person and/or device. According to some aspects, MFA kiosk 400 may be embodied as a computer-implemented method on a MFA kiosk, the computer-implemented method comprising performing various methods, steps, and processes related to the authentication of an individual person and/or device. In yet another embodiment, MFA kiosk 400 may be implemented as a system for multi-factor authentication comprising one or more computers with executable instructions that, when executed, cause the system to execute various methods and processes related to the authentication of an individual person and/or device. In another embodiment, MFA kiosk 400 may be implemented as non-transitory, computer-readable storage media having computer-executable instructions embodied thereon that, when executed by one or more processors of a computing system employing an MFA kiosk, cause the computing system to execute various methods and processes related to the authentication of an individual person and/or device.

As illustrated, MFA kiosk 400 may represent an immersive or non-immersive embodiment. MFA kiosk 400 may represent a micro-kiosk in some embodiments.

According to the embodiment, MFA kiosk 400 comprises a user interface (UI) 411 which may be a graphic user interface (GUI) rendered on a display unit 410 of the kiosk. A display and user interface are not necessary, but may make it easier to facilitate some authentication processes in one or more aspects of the embodiment. The display may be an interactive touchscreen. Additionally, MFA kiosk 400 may be connected to or integrated with (i.e., embedded in the system) one or more I/O (input/output) devices 420 which can be used for the input and output of data or signals as required by the kiosk. Exemplary peripheral devices can include input devices (e.g., keyboard, mouse, touchpad or trackpad, graphic tablet, etc.), output devices (e.g., monitor or display, printer, projector, transducers, etc.), storage devices (e.g., hard disk drive, solid state drive, etc.), audio devices (e.g., speakers, headphones or earphones, microphones, etc.), webcam, game controllers, joystick, virtual reality or augmented reality hardware (e.g., headset, goggles), biometric devices (e.g., fingerprint scanner, facial recognition camera, etc.), and/or the like.

According to the embodiment, MFA kiosk 400 further comprises a plurality of sensors 430*a-n* either directly integrated into the structure of the kiosk or otherwise embedded in the system. Additionally, or alternatively, an external set of sensors may be added to the system that operate outside of the structure of the kiosk, but still able to communicate data to the kiosk for the purpose of authentication. Both sets of sensors may be configured to capture various physical, biometric, and physiological data of an individual interacting with the kiosk for the purpose of authenticating the individual. The plurality of physical, biometric, behavioral, and physiological data captured by sensors 420*a-n* can be used to construct a physical profile of an individual that can be used as a factor in multi-factor authentication. Some exemplary sensors that may be implemented in various embodiments of MFA kiosk can include, but are not limited to, infrared scanner, fingerprint scanner, facial recognition camera, iris scanner, voice recognition via audio sensors, hand geometry scanner, vein scanner, gait analysis via camera and/or pressure sensors, gyroscopes, accelerometers, electrocardiogram (ECG) sensors, x-ray sensors, and body odor sensors.

A physical profile of a user may comprise one or more unique physical, biometric, behavioral, and/or physiological attributes or traits of an individual which can be used to identify, verify, and/or authenticate the individual using MFA kiosk 400. Examples of physical or behavioral characteristics/attributes of an individual for the purpose of identification or authentication that can be included in an individual's physical profile and based on data captured by MFA kiosk 400 can include, but are not limited to, fingerprints, facial recognition, iris patterns, retina patterns (e.g., analyze blood vessel patterns at the back of the eye using a low-intensity infrared light to capture unique patterns), voice recognition (e.g., analyzer voice characteristics such as pitch, tone, and speech patterns), hand geometry (e.g., capture length, width, thickness, and surface area of the hand to create a template for identification), vein patterns (e.g., analyze the vein patterns beneath the skin's surface using near-infrared light to capture the unique vein patterns), gait analysis, ECG patterns, signature recognition, key stroke analysis and dynamics (e.g., capture the timing, pressure, and duration of key strokes to create a behavioral biometric for authentication), body odor composition (e.g., analyze the unique chemical composition of an individual's body odor), ear shape recognition (e.g., analyze shape and structure of the ear to capture unique features such as the size and shape of the ear canal), palm print recognition, lip motion analysis, nailbed recognition (e.g., captures the patterns and features of the nailbed for identification), posture analysis (e.g., how a person sits, stands, or moves), and thermal facial recognition. These exemplary biometric and behavioral characteristics demonstrate the diversity of technologies that may be used to capture and analyze various physiological and behavioral traits for identification and authentication purposes. The choice of specific biometric method(s) often depends on various factors such as security requirements, user acceptance, rules and policies, and the intended application of the embodiment.

MFA kiosk 400 may comprise a plurality of services, each of which may be configured to perform various tasks related to authentication, data management, and kiosk operational management, among others. According to the embodiment, a kiosk management service 460 is present and configured to provide functionality for the management and operation of a kiosk such as, for example, registering kiosks and detecting counterfeit kiosks. When registering a kiosk to be a part of a MFA kiosk network, kiosk management service 460 may utilize network policies that include encryption standards, authentication methods, and specific protocols in use. Additionally, kiosk management service 460 can ensure that the registered kiosk has a unique identifier, such as a MAC address or device certificate, that can be used to track and manage the kiosk on the network. In embodiments where multiple MFA kiosks create a network, kiosk management service 460 enforces secure connection methods to establish communication with each other and the network. This may involve using WPA2/WPA3 for Wi-Fi networks of a virtual private network for secure remote connection. Kiosk management service 460 may also be configured to monitor log data and security alerts to identify any unusual or unauthorized activities.

According to some aspects, kiosk management service 460 can be configured to gather kiosk operational data. Kiosk management service 460 can be further configured to gather kiosk operational data over a given time interval (e.g., one hour, one day, one week, etc.). Kiosk management service 460 may be further configured to gather operational data with respect to an individual kiosk, or multiple kiosk forming a group or sub-group. Operational data can include, but is not limited to, the number of unique users interacting with the kiosk, the number of authentication attempts (successful and unsuccessful), average time spent by users at the kiosk, sensor usage statistics (e.g., which biometric sensors are used most frequently), system performance metrics (e.g., response times, processing times, memory usage, etc.), error logs and diagnostic information, software and firmware version information, kiosk uptime and availability, energy consumption, and user feedback and ratings. This operational data can provide insights into the usage patterns, performance, and health of the kiosk system. It can help identify potential issues, optimize resource allocation, plan maintenance activities, and make data-driven decisions to improve the overall user experience and operational efficiency of the MFA kiosk network.

According to the embodiment, MFA kiosk 400 further comprises a rules service 440 which can allow for the setting of various rules and policies directed to authentication. The owner/operator or an administrator of an MFA kiosk 400 may be able to set rules and policies directed to authentication and which may be applied at various scales such as, for example, applied locally only to authentication tasks performed by single kiosk or applied to a subset of (or entirety of) a network of connected kiosks. Rules and policies may be set to apply at the individual user, group, or subgroup level. For example, an individual user may have to be authenticated at the group level using set of rules and policies, and then authenticated at the individual level using a stricter set of rules and policies. The stricter set of rules and polices may be specific to an individual user and different than those applied to another individual even if that individual belongs to the same group. Rules and policies may be applied based on geographical constraints. For example, for a network of connected MFA kiosks stationed around a city, a specific set of rules and policies may be applied to only kiosks operating in a geographic area of the city corresponding to an area code. As another example, for a network of connected MFA kiosks in a medical facility, a different set of rules and policies may be applied to each floor or wing.

According to the embodiment, rules and polices may be stored in a rules database 490 stored in a memory and/or non-volatile data storage device. A simple example of a rule and policy related to authentication that may can be applied by rules service 440 is a rule related to password complexity. For example, the rule could require users to create strong and complex passwords utilizing a sequence of body movements (e.g., hand gestures, limb movement/positioning, specific movement such as a jumping jack, etc.). A rule/policy may be directed to account lockout policy which temporarily lock user accounts after a specified number of unsuccessful login attempts with definable duration and lockout period parameters. According to an embodiment, one or more rules/policies can be directed to user account provisioning and de-provisioning that establishes processes for creating, modifying, and deleting user accounts. For example, a policy may ensure the system disable or delete accounts promptly when employees leave an organization.

According to various embodiments, one set of rules and policies is directed to multi-factor authentication, wherein users must provide multiple forms of identification (e.g., password, PIN, and biometric verification). Rules and polices directed to MFA may specify authentication parameters such as the number and types of factors required for authentication. In various embodiments, at least one of the factors is a biometric factor based on a physical profile. The multiple factors may include something the user knows (e.g., password involving physical movement), something the user is (e.g., biometric), and something the user has (e.g., a device). In some embodiments, MFA may comprise secret, knowledge, and fact-based authentication together in some combination. Additional factors can include one-time passwords, smart cards, or mobile application authentications as part of the multi-factor authentication process. In some embodiments, the order of knowledge or biometric indicators may be configured to augment and generate a unique password (i.e., elbows, shoulders, knees and toes from the children's song but could equally include gait, heartbeat, brainwaves, eyes, finger on left hand then thumb on right hand, etc.).

According to various embodiments, one set of rules and policies is directed to the creation and modification of physical profiles. These rules/policies may indicate the type(s) of biometric and/or behavioral characteristics/attributes to be included in the physical profile. Additionally, these rules/policies may indicate a precedence level to be applied to each of a plurality of stored biometric and/or behavioral characteristics such that some characteristics may be weighted more significantly (or less) when compared to another stored characteristic. In this way, a hierarchy of biometric and/or behavioral characteristics can be established and utilized during multi-factor authentication processes as conducted by MFA kiosk 400. In some embodiments, this hierarchical representation of characteristics may be used to create different tiers of authentication, wherein access to a service, application, and/or endpoint is restricted only to users that can provide authentication to the appropriate tier.

According to various embodiments, one set of rules and policies is directed to data retention polices that define clear data retention that limit the storage duration of biometric data and outline secure deletion processes to permanently remove biometric data when it is no longer needed.

According to the embodiment, MFA kiosk 400 further comprises a sensor management service 450 which can provide functionality directed to the management and deployment of various sensors 430*a-n* both onboard and/or exterior to the kiosk. A kiosk owner/operator or administrator can use sensor management service 450 to set operational parameters of the plurality of sensors 430*a-n*. A set of operational parameters can include information related to, but not limited to, the sampling rate (e.g., the rate at which sensors take measurements), resolution (e.g., the smallest detectable change in the quantity being measured), sensitivity, range (e.g., the range of values over which the sensor can effectively operate), filtering, and threshold (e.g., setting threshold levels for triggering alarms or specific actions based on sensor readings exceeding or falling below certain values). Additional operational parameters can include integration time (e.g., duration over which the sensor collects data for a single measurement), power consumption, communication protocol (e.g., I2C, SPI, UART, Bluetooth, Wi-Fi, etc.), data format (e.g., specifying the format in which the sensor data is transmitted or stored, encryption, operating temperature range, response time, and auto-scaling (e.g., enabling or disabling auto-scaling features that adjust the sensor's dynamic range based on the input signals). These parameters can be adjusted and configured to optimize the performance of a sensor or sensor array for specific applications and environmental conditions. It should be appreciated that different sensor types (e.g., temperature sensors, pressure sensors, image sensors) may have unique parameters relevant to their specific measurement characteristics.

In some implementations, sensor management service 450 is configured to monitor and/or obtain sensor state information and perform various processing and analysis thereof. General sensor state information can include data such as the total number of sensors reporting to the kiosk, the type of sensors (e.g., electromagnetic, pressure, x-ray, cranial, etc.), a type of biometric associated with the sensor (e.g., a facial template from a facial recognition camera), and other sensors specifics such as operating parameters. More specifically, sensor state information can comprise information about completeness of sensor coverage, audit data of all physical and digital interactions with sensors, and recent measurements (e.g., to perform ongoing accuracy verifications of sensors in part and/or in aggregate). Sensor state information may include derived data such as sensor accuracy and precision measurements computed based on recent measurement data. Sensor management service 450 may store received and/or derived sensor state information in database 490. In some embodiments, a subset of sensor state information may be used as input into a scoring model to determine an authentication score for a profile. For example, sensor capabilities and sensor accuracy/precision values for each sensor may be considered when generating an authentication score for an individual or a kiosk.

According to the embodiment, MFA kiosk may optionally comprise a cloud identity verification exchange service (CIVEXS) 480 which enables verification of authentication transactions across multiple cloud identity providers, providing a single service where any Identity Provider can enroll and add a record of identity assertions. Additionally, CIVEXS 480 can provide the ability to understand the degree of identity assurance risk associated with authentication transaction auditability, enforcement, and security in other organizations they interact with via the same CIVEXS capability. For more detailed information about CIVEX service 480 please refer to U.S. patent application Ser. No. 18/354,658 which is incorporated herein by reference.

According to the embodiment, MFA kiosk 400 further comprises an authentication service 470 configured to receive a plurality of biometric/behavioral data from sensors 430*a-n*, process the biometric/behavioral data, and apply one or more rules/polices to the processed data to perform various authentication tasks for multi-factor authentication. For example, during an individual's initial interaction with the kiosk, authentication service 470 can construct the individual's physical profile using the plurality of sensor data. Some of the biometric/behavioral data processing may be completed at the sensor and then the processed data can be sent to authentication service 470 to perform authentication. For example, a facial recognition camera may have built in processors that can collect video data and process the video data to identify or verify the user.

According to an implementation, authentication service 470 may implement one or more rules and polices directed to factor selection for multi-factor authentication. For example, a corporate policy may indicate that a password and one biometric/behavioral factor or a minimum computed authentication score is sufficient to gain access to a corporate office, but in order to access certain systems or processes, authentication may require a password augmented with physical movement or voice utterances and at least three biometric/behavioral factors. It should be further appreciated that one or more rules or policies may be directed to a hierarchy of factors which can be used for authentication. In such an embodiment, multi-factor authentication factors may be placed in tiers. For example, a first set of factors in the highest tier may be used to authenticate a user, wherein a single factor from the first set is sufficient for authentication. Continuing the example, a second set of factors may be placed in the second tier wherein multiple factors of second set of factors is required for authentication. In this embodiment, if an individual, for some reason, fails a tier one factor, then authentication service 470 can optionally utilize multiple lower tier factors to provide authentication of the individual.

Authentication service 470 may also be configured to collect authentication state information and process and/or analyze said data. Authentication state information can comprise general information such as a number of authentication attempts (per user, group, or in total) at the kiosk, a number of failed authentication attempts (per user, group, or in total) at the kiosk, and types of authentication factors per attempt. Obtained authentication state information may be stored in database 490 and may be used as an input for generating an authentication score for a individual or a kiosk.

In at least one embodiment, authentication service 470 may utilize a trained scoring model to generate an authentication score based on various inputs which may be obtained either from the one or more services or databases 490 described herein. In some aspects of the embodiment, the scoring model may be a trained machine or deep learning algorithm. According to an aspect the deep learning algorithm is a neural network such as a multi-layer perceptron or a recurrent neural network. Given the complexity and the non-linearity in the data, a deep learning model such an autoencoder may be implemented in some embodiments, due to its ability for unsupervised feature learning. Scoring model input data can include sensor state information, authentication state information, and rule/policy based information. Creating an authentication scoring model based on a variety of inputs such as biometric sensor data, information about previous authentication attempts, and authentication rules/policies involves a combination of feature engineering and data preprocessing.

Feature engineering may comprise extracting relevant features from biometric sensor data, such as sensor type, accuracy, precision, and the type of biometric factor measure, incorporating features related to previous authentication attempts such as total number of attempts, total failed authentications, and the types of factors used, and including features from authentication rules and polices such as the type and number of biometric factors required, specific movements or actions as factors, and any group-specific or individual-specific rules. According to an embodiment, an autoencoder (or other classifier network) trained on this type of data can generate as output an authentication score for an individual or kiosk. For example, an autoencoder may output a numerical value between 0 and 1.0, inclusive, which corresponds to a classification related to authentication that can be interpreted as the authentication score.

Biometric data security is necessary to protect individuals' sensitive information from unauthorized access and potential misuse. MFA kiosk can implement strong security measures for storing and protecting biometric data such as using encryption and following best practices to prevent unauthorized access to or tampering of stored physical profiles (and the biometric templates stored therein). In various embodiments MFA kiosk 400 utilizes encryption for both the transmission and storage of biometric data. For example, MFA kiosk can be configured to use secure socket layer or transport layer security protocols for encrypting data transmitted between devices, services, and databases. Furthermore, MFA kiosk can encrypt stored biometric templates in the database using strong encryption algorithms to safeguard against unauthorized access. Some aspects may implement encryption at the file level to secure biometric data stored in files (e.g., physical profile) or databases. One method for secure storage may involve tokenization, wherein the kiosk is configured to store references or tokens instead of raw biometric data to protect sensitive information. Another method may involve hashing wherein biometric data is converted into irreversible hashes using strong cryptographic hashing algorithms. In some embodiments, MFA kiosk may be designed for isolation of components such that components are physically and logically separate to reduce the risk of unauthorized access. Additionally, MFA kiosk 400 may be configured to ensure compliance with data protection regulations such as GDPR, HIPAA, CCPA or other relevant laws that govern the collection and storage of biometric data.

According to at least one embodiment, database 490 may comprise an immutable digital ledger on which sensor data (in whole or in part) is kept on record for posterity. For example, block chain technology may be used in an aspect of an embodiment to provide an immutable digital ledger for storage of sensor data, but also physical profiles biometric template data.

Detailed Description of Exemplary Aspects

Figure 5:
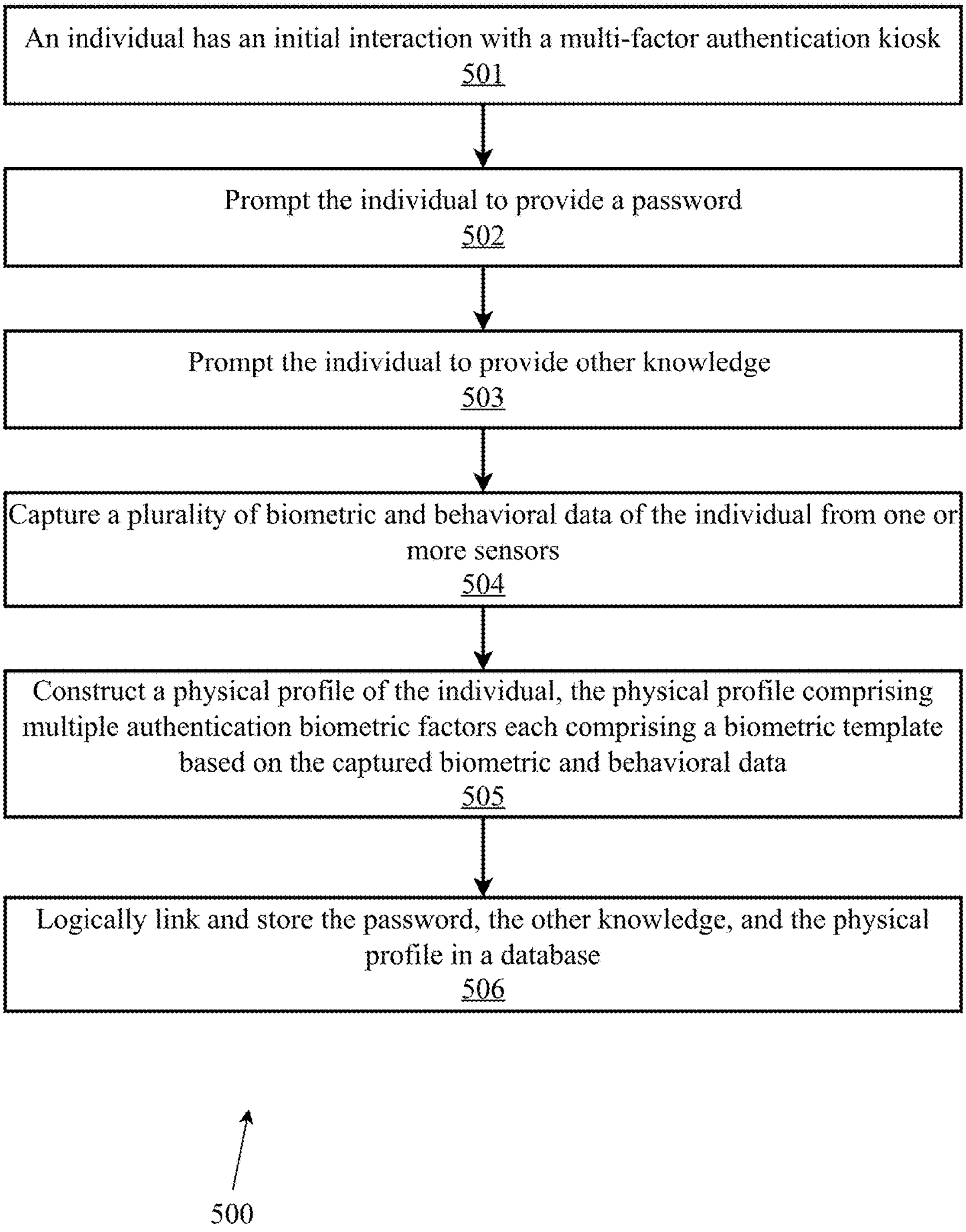
FIG. 5 is a flow diagram illustrating an exemplary method for constructing a physical profile for an individual during an initial interaction with an MFA kiosk, according to an embodiment.

FIG. 5 is a flow diagram illustrating an exemplary method 500 for constructing a physical profile for an individual during an initial interaction with an MFA kiosk, according to an embodiment. According to an embodiment, the process begins at step 501 during an individual's initial interaction with a multi-factor authentication kiosk. In embodiments wherein a display is present MFA kiosk may display a greeting or some other message when an individual approaches. For example, one or more sensors (e.g., cameras, motion sensors, pressure sensors in the surface of the floor, heat/infrared sensors, microphones, etc.) may determine when an individual approaches the kiosk and displays an introductory message/greeting or some form of prompt directed to the individual. As another example, the kiosk may be able to detect a device of an individual that approaches the kiosk to determine when an individual is present. In some implementations, biometric/behavioral data may be captured by the MFA kiosk and compared against stored physical profiles and biometric templates to determine if the individual has a stored physical profile in the system. In some embodiments, the kiosk may prompt the individual for consent prior to capturing the individual's biometric/behavioral data.

It is determined that the individual does not have a profile on record so the user registration process may begin (with the user's consent) and the individual may be prompted to provide a password at step 502. The registration process may comprise various steps of gathering user data and compiling a physical profile. The password (or some other form of secret knowledge) may be stored as part of the physical profile of the individual user or otherwise logically linked to the physical profile. The individual's password may be augmented according to one or more rules or policies to enhance security and user verification. For example, a password can be augmented with a series of physical movements or any other biometric indicator (e.g., gait, heartrate, vein pattern, surgical debris such as screws, plates or other implants, iris pattern, brainwaves, etc.). At a next step 503, MFA kiosk prompts the individual to provide other knowledge such as general knowledge and user demographics.

At step 504 MFA kiosk captures a plurality of biometric and behavioral data of the individual from one or more sensors. The biometric data may be processed locally by the sensor (if the sensor is configured for such actions) or it may be processed by an authentication service 470 configured to create various biometric templates which are then stored in the physical profile and used as biometric factors for multi-factor authentication, according to various embodiments. Exemplary biometric templates can include, but are in no way limited to, fingerprint, facial template, iris pattern, retina template, voice template, hand geometry template, vein pattern template, gait template, ECG template, signature template, key stroke template, body odor template, ear shape template, palm print, lip motion template, nailbed template, posture template, thermal facial template, and blood flow template, to name a few. At step 505 MFA kiosk constructs the physical profile of the individual, the physical profile comprising multiple authentication biometric factors each comprising a biometric template based on the capture biometric and behavioral data. As a last step 506, MFA kiosk logically links (or incorporates) and stores the password, the other knowledge, and the physical profile in a database. The data may be encrypted and stored to protect the individual's information.

Figure 6:
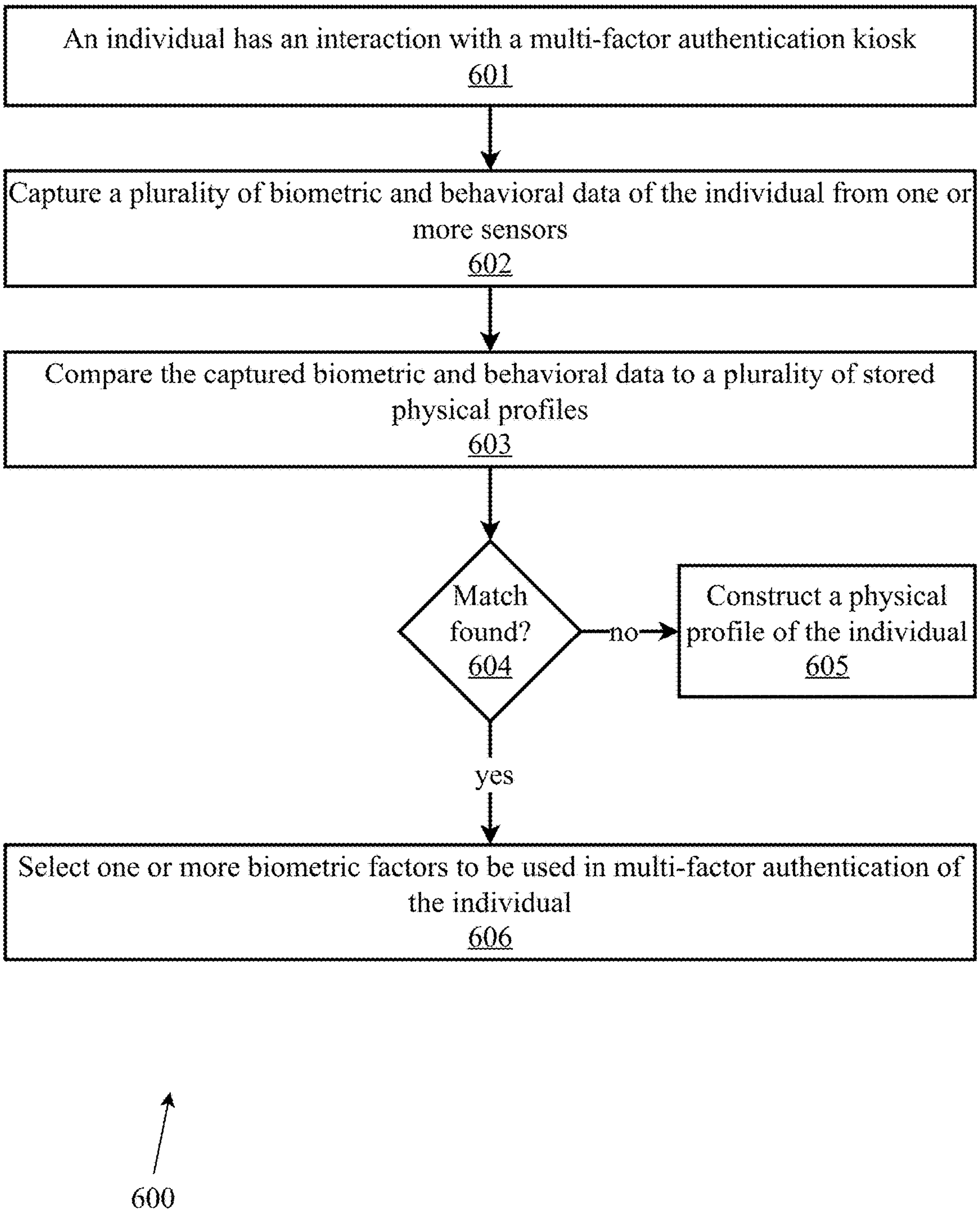
FIG. 6 is a flow diagram illustrating an exemplary method for providing multi-factor authentication to an individual using an MFA kiosk, according to an embodiment.

FIG. 6 is a flow diagram illustrating an exemplary method 600 for providing multi-factor authentication to an individual using an MFA kiosk, according to an embodiment. According to an embodiment, the process begins at step 601 when an individual interacts with a multi-factor authentication kiosk. The individual may be seeking access to a restricted, controlled, or otherwise secured service, application, endpoint, resource, and/or location. In some embodiments, the individual may receive a prompt from the kiosk. The prompt may be a request to perform a specific action (e.g., stand still, perform series of gestures related to an augmented password, recite a phrase, follow a breathing pattern, etc.) or a request for information. The prompt may indicate to the individual that authentication is happening and to be still or to move to specified location near or around the kiosk to facilitate biometric and/or behavioral data capture. At step 602 the MFA kiosk captures a plurality of biometric and behavioral data of the individual from one or more sensors. At step 603, MFA kiosk compares the captured biometric and behavioral data to a plurality of stored physical profiles. A check is made 604 whether a match was found or not. If no match is found then the process proceeds to step 605 wherein MFA kiosk constructs a physical profile of the individual in a process which may be implemented similar to method 500. If instead, a match is found then the process proceeds to step 606 wherein MFA kiosk selects one or more biometric factors to be used in multi-factor authentication of the individual. In some embodiments, the selection of the type and/or quantity of biometric factor may be based at least in part on one or more rules or policies. In some embodiments, the selection of the type and/or quantity of biometric factor may be based at least in part on the location of the kiosk. In some embodiments, the selection of the type and/or quantity of biometric factor may be based at least in part on the status of prior authentication attempts or events associated with individual or physical profile. For example, in embodiments with hierarchical biometric factors, overcoming a failure of a higher tier authentication factor may require an individual to pass multiple lower tier authentication factors to be fully authenticated.

Figure 7:
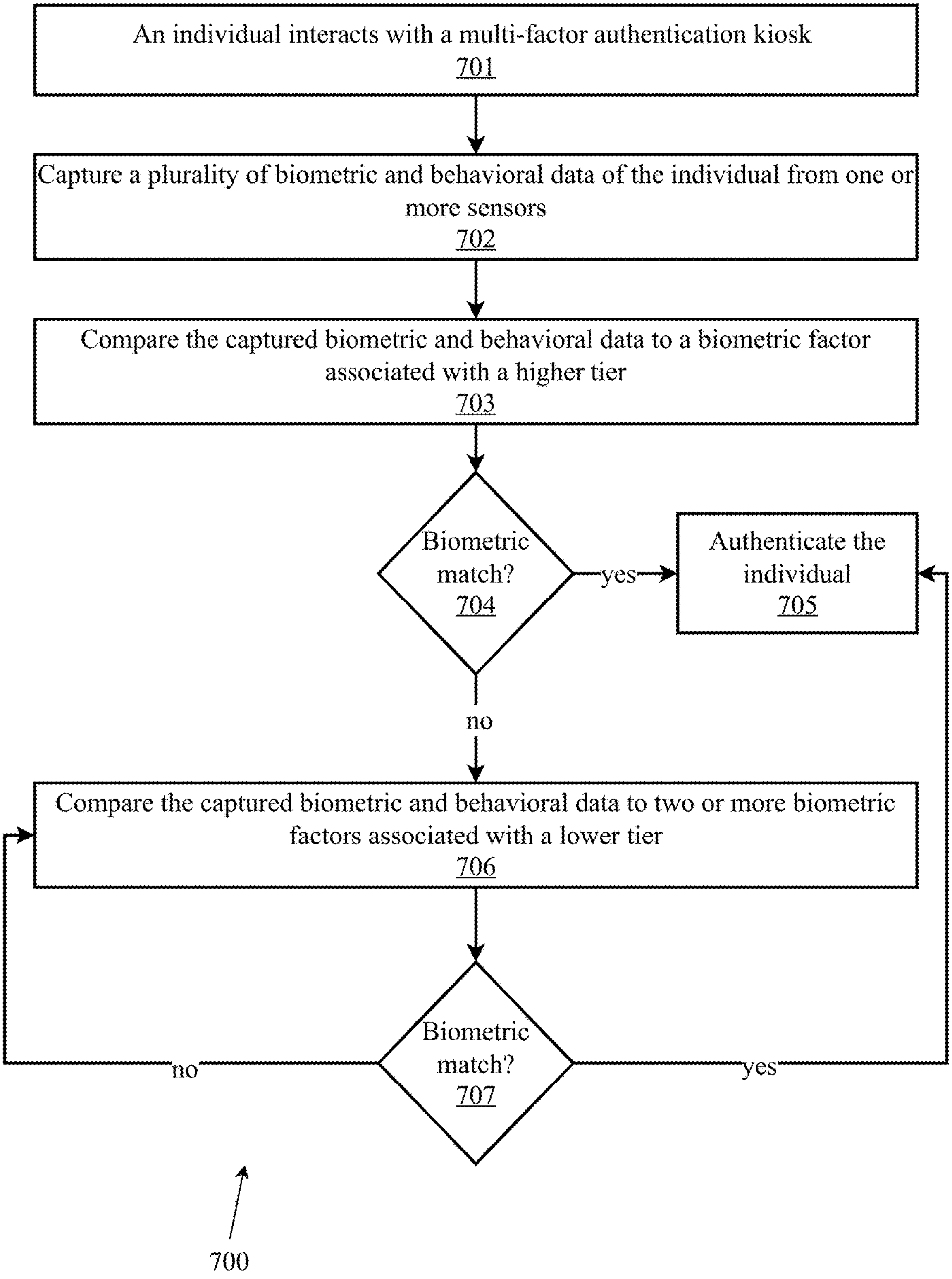
FIG. 7 is a flow diagram illustrating an exemplary method for providing multi-factor authentication to an individual using an MFA kiosk with hierarchical biometric factors, according to an embodiment.

FIG. 7 is a flow diagram illustrating an exemplary method 700 for providing multi-factor authentication to an individual using an MFA kiosk with hierarchical biometric factors, according to an embodiment. According to an embodiment, the process begins at step 701 when an individual interacts with a multi-factor authentication kiosk. The individual may be seeking access to a restricted, controlled, or otherwise secured service, application, endpoint, resource, and/or location. In some embodiments, the individual may receive a prompt from the kiosk. The prompt may be a request to perform a specific action (e.g., stand still, perform series of gestures related to an augmented password, recite a phrase, follow a breathing pattern, etc.) or a request for information. The prompt may indicate to the individual that authentication is happening and to be still or to move to specified location near or around the kiosk to facilitate biometric and/or behavioral data capture. At step 702 the MFA kiosk captures a plurality of biometric and behavioral data of the individual from one or more sensors. At step 703, MFA kiosk compares the captured biometric and behavioral data to a biometric factor associated with a higher (e.g., a first) tier. A plurality of biometric factors may be arranged into a hierarchy comprising various factor tiers, wherein biometric factors in a higher tier represent more secure or accepted factors for multi-factor authentication than biometric factors assigned to a lower tier. In some embodiments, the hierarchy of biometric factors may be based at least in part on one or more rules or polices which may be specified by the kiosk owner/operator or administrator. In some embodiments, the hierarchy may be based at least in part on the available sensors, their configuration, and calibration.

A check is made 704 whether a match was found or not. If a match was found, then the process proceeds to step 705 wherein MFA kiosk authenticates the individual using the matched higher tier biometric factor. If instead, a match is not found, then the process proceeds to step 706 wherein MFA kiosk compares the captured biometric and behavioral data to two or more biometric factors associated with a lower tier. In some embodiments, the selection of the type and/or quantity of biometric factors from the lower tier may be based at least in part on one or more rules or policies. In some embodiments, the selection of the type and/or quantity of biometric factors from the lower tier may be based at least in part on the location of the kiosk. In some embodiments, the selection of the type and/or quantity of biometric factors may be based at least in part on the status of prior authentication attempts or events associated with individual or physical profile. For example, in embodiments with hierarchical biometric factors, overcoming a failure of a higher tier authentication factor may require an individual to pass multiple lower tier authentication factors to be fully authenticated. Another check is made at 707 to determine if two or more of the selected biometric factors match the captured biometric and behavioral data. If a match is found then the user may be authenticated at step 705. If a match is not found then the process repeats step 706 with a lower tier of biometric factors. This process may be repeated until the individual has been authenticated, until the individual has exhausted all existing tiers, or the individual is locked out due to rules which regulate the number of attempts at authentication that may be attempted before the account is locked.

FIG. 8 is a flow diagram illustrating an exemplary method 800 for providing multi-factor authentication to an individual using an MFA kiosk with an authentication threshold, according to an embodiment. According to an embodiment, the process begins at step 801 when an individual interacts with a multi-factor authentication kiosk. The individual may be seeking access to a restricted, controlled, or otherwise secured service, application, endpoint, resource, and/or location. In some embodiments, the individual may receive a prompt from the kiosk. The prompt may be a request to perform a specific action (e.g., stand still, perform series of gestures related to an augmented password, recite a phrase, follow a breathing pattern, etc.) or a request for information. The prompt may indicate to the individual that authentication is happening and to be still or to move to specified location near or around the kiosk to facilitate biometric and/or behavioral data capture. At step 802 the MFA kiosk captures a plurality of biometric and behavioral data of the individual from one or more sensors. At step 803, MFA kiosk compares the captured biometric and behavioral data to a plurality of biometric factors stored in a physical profile associated with the individual. At 804 a check is made to determine if a predetermined threshold of authentication has been met. If the threshold has been met, then MFA kiosk authenticates the individual at step 805. In some embodiments, the threshold may be based at least in part on one or more rules or polices which may be specified by the kiosk owner/operator or administrator.

In embodiments wherein an authentication threshold is used to authenticate the individual, the various biometric factors may be assigned a score, weight, or some other value that indicates an increment of authentication that that particular biometric factor contributes to an overall authentication threshold value. In such embodiments, the scores/weights associated with matched biometric factors may summed or otherwise aggregated to compute a total authentication score. If the total authentication score meets or exceeds the predetermined threshold value, then the individual may be authenticated at step 805. If the threshold is not met, then the process proceeds to step 806 wherein MFA kiosk compares the captured biometric and behavioral data to additional biometric factors stored in the physical profile associated with the individual. The scores/weights of the matched additional biometric factors may be added to the total score computed at step 803 to determine if the threshold is met at 804. This process repeats until the individual is authenticated, all existing biometric factors are exhausted, or the individual is locked out due to rules which regulate the number of attempts at authentication that may be attempted before the account is locked.

Figure 9:
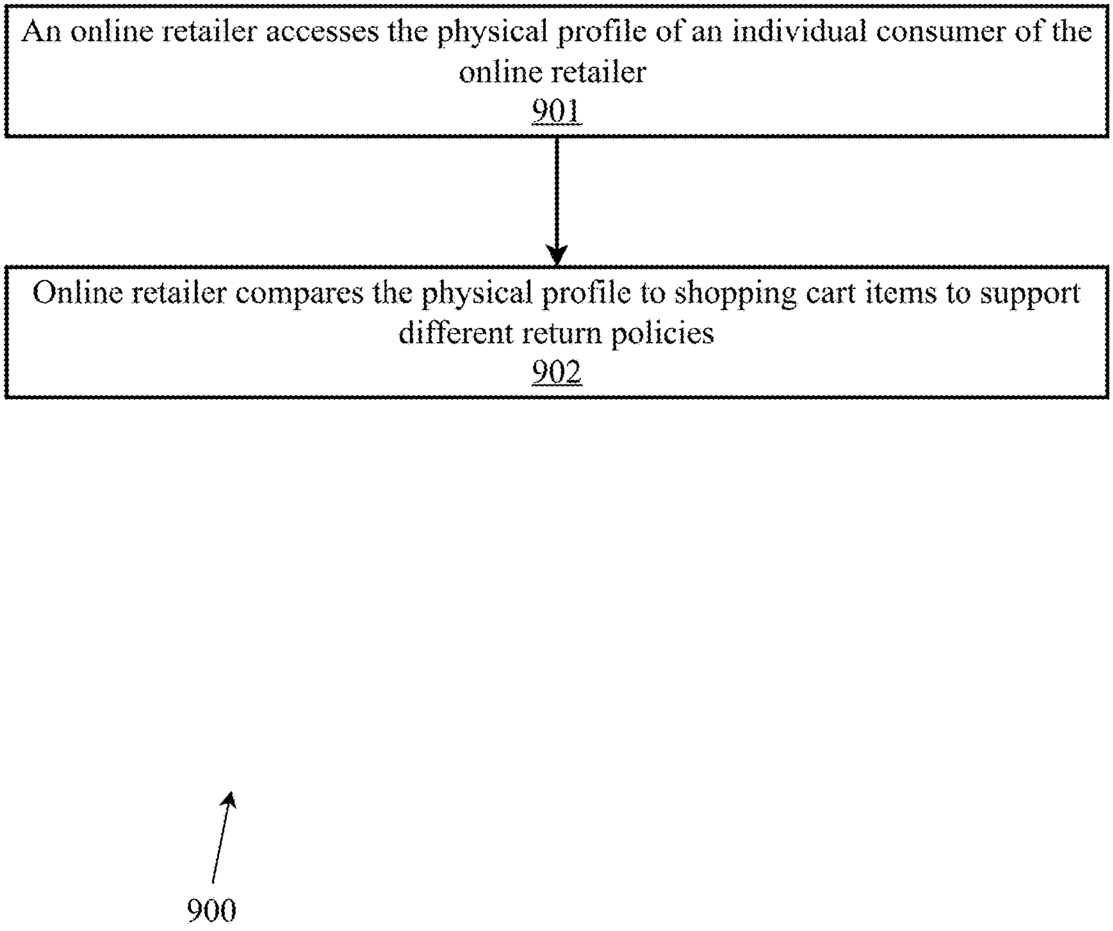
FIG. 9 is a flow diagram illustrating an exemplary method for utilizing an MFA kiosk to facilitate e-commerce transactions, according to an embodiment.

FIG. 9 is a flow diagram illustrating an exemplary method 900 for utilizing an MFA kiosk to facilitate e-commerce transactions, according to an embodiment. According to an embodiment, the process begins at step 901 when an online retailer accesses the physical profile of an individual who is also a consumer of the online retailer. The online retailer can then compare the physical profile to the shopping cart items to support different business policies at step 902. For example, the retailer could compare the verified physical profile of the consumer with shopping cart items to support different return policies based on its actual and expected sizing of clothing or footwear. Continuing the example, if the consumer says they are buying a piece for themselves and its within their sizing windows they may have different pricing on shipping, returns, etc. than if the consumer was buying a gift for another person without a profile. Similarly, if the profile is registered and available to the retailer for gift purposes, there may likewise be different pricing, return policies, or shipping options or procedures. Since returned clothing is often processed through massive reverse logistics systems that are rampant with overhead costs, product degradation, etc., this can enable strong incentives for accurate buying and gifting while allowing retailers to avoid intentional theft via malicious rentals where clothes are over ordered or “borrowed” via return policy abuse in letter or spirit.

Figure 10:
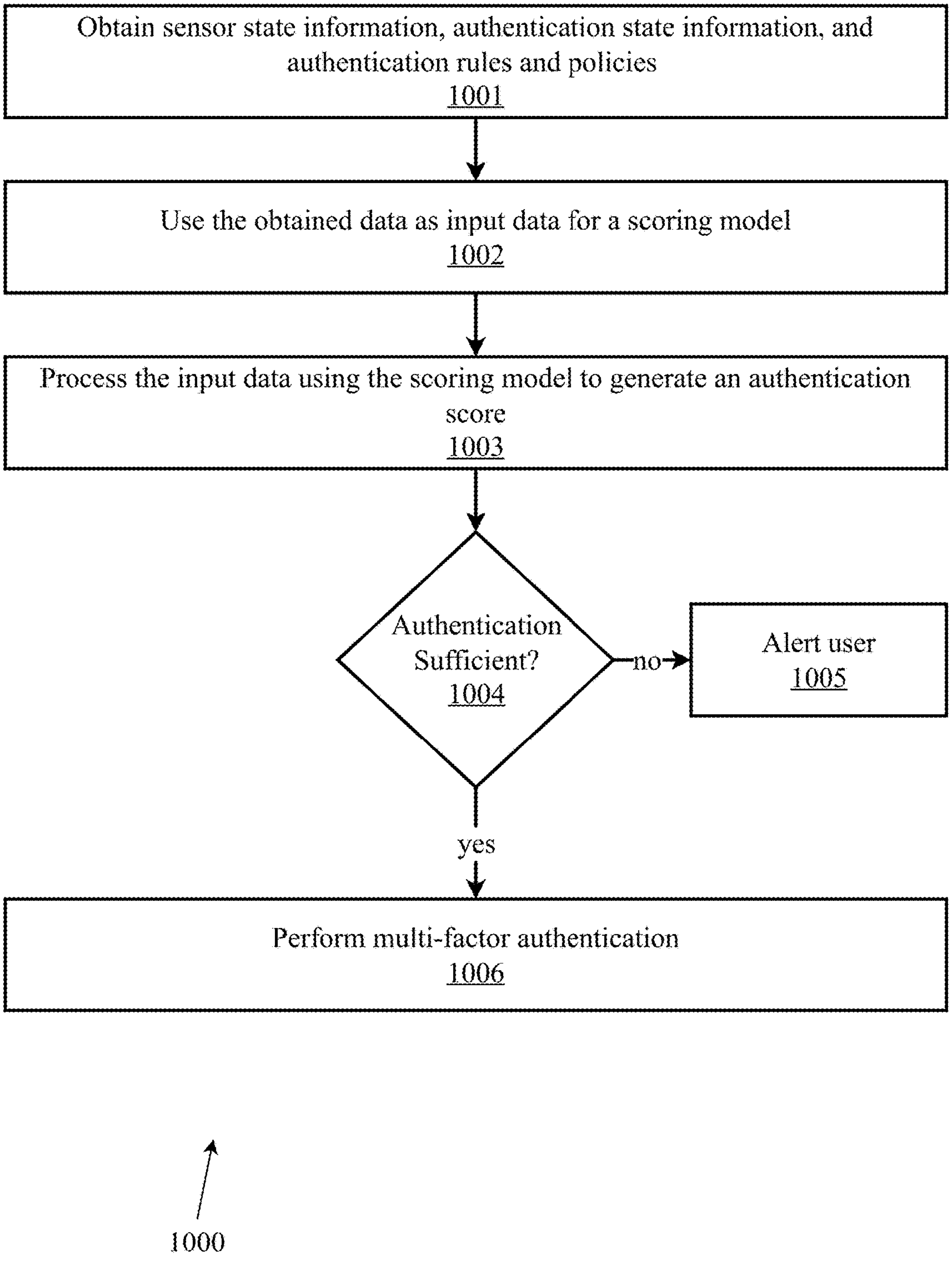
FIG. 10 is a flow diagram illustrating an exemplary method for an MFA kiosk providing multi-factor authentication using an authentication score, according to an embodiment.

FIG. 10 is a flow diagram illustrating an exemplary method 1000 for a MFA kiosk providing multi-factor authentication using an authentication score, according to an embodiment. According to the embodiment, the process begins at step 1001 wherein authentication service obtains sensor state information, authentication state information, and authentication rules and polices. The obtained information may be retrieved from storage in database 490 or directly from one or more other services operating on the kiosk. At step 1002, the obtained data is used as input data for a trained scoring model. The trained scoring model may be a neural network or variation thereof, according to an embodiment. The trained scoring model process the input data to generate an authentication score at step 1003. The authentication score may be indicative of whether a given kiosk is sufficient or insufficient to complete a given task (i.e., authentication task) given the context, timing, and place of the user and the actions seeking to be authorized. A check is made at 1004 whether the computed authentication score means the kiosk is sufficient. If the authentication is not sufficient, then the process proceeds to step 1005 wherein MFA kiosk can alert the user that the kiosk may not be able to provide the level of authentication needed to complete the action. If instead, the authentication is sufficient, then the process proceeds to step 1006 wherein the MFA kiosk performs the multi-factor authentication according to one or more of the various methods described herein.

Exemplary Computing Environment

Figure 11:
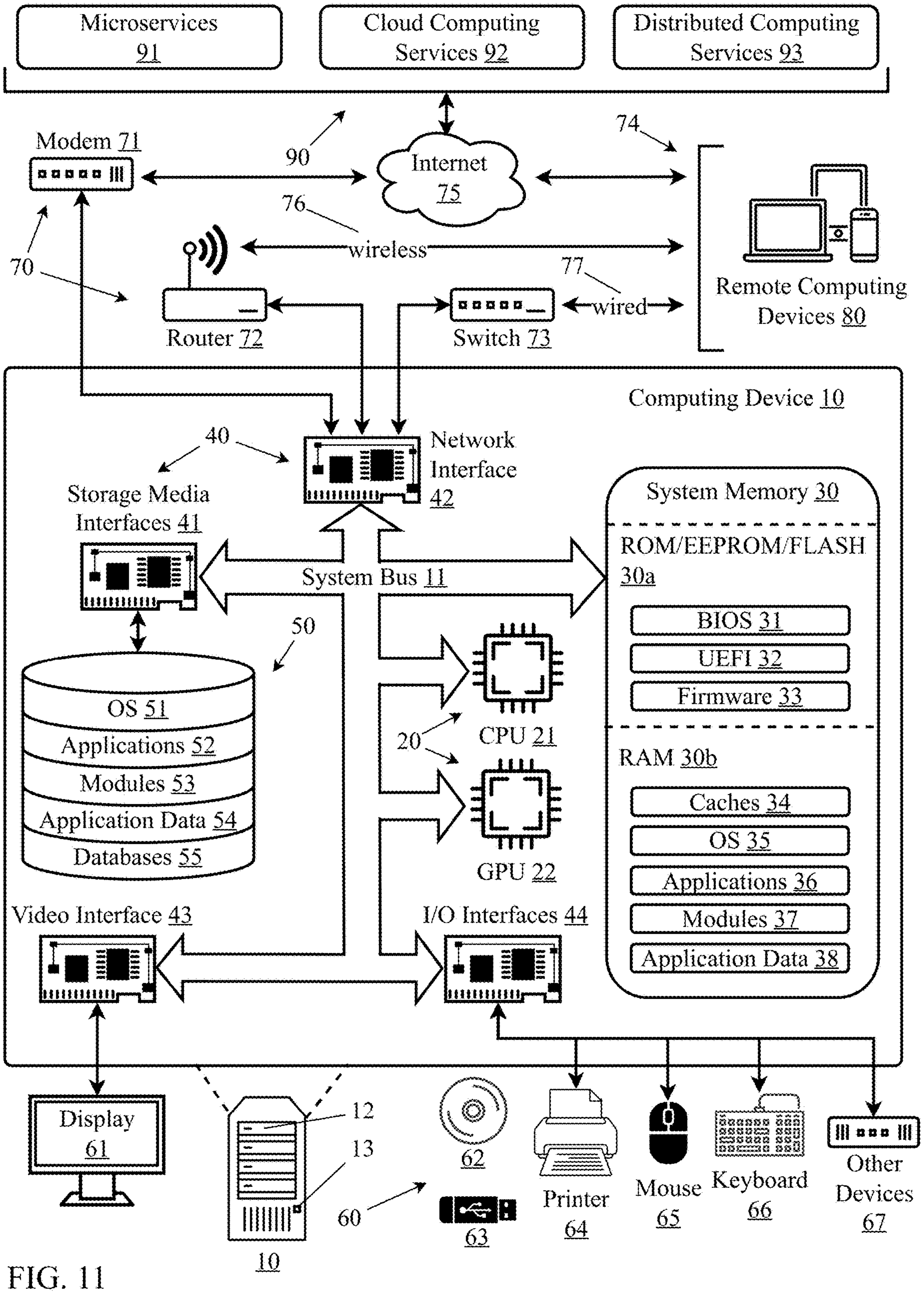
FIG. 11 illustrates an exemplary computing environment on which an embodiment described herein may be implemented.

FIG. 11 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for multi-factor authentication (MFA) employing an MFA kiosk, the computing system comprising:

one or more hardware processors configured for:

receiving a first plurality of biometric and behavioral data associated with an individual from one or more sensors within or in physical proximity to the MFA kiosk;

constructing a physical profile associated with the individual, wherein the physical profile comprises one or more biometric templates;

storing the physical profile of the individual in a database;

receiving a request to provide authentication for a physical or digital persona of the individual;

receiving, based on the request to provide authentication for the physical or digital persona of the individual, a second plurality of biometric and behavioral data associated with the individual from at least some of the one or more sensors;

comparing the second plurality of biometric and behavioral data with the stored physical profile to identify one or more matching biometric templates to be used to perform multi-factor authentication of the individual; and performing multi-factor authentication of the individual by comparing the second plurality of biometric and behavioral data with one or more of the matching biometric templates to provide authentication for the physical or digital persona of the individual, wherein the multi-factor authentication is based on whether a total authentication score from the second plurality of biometric and behavioral data exceeds a minimum threshold authentication score needed for authentication of the physical or digital persona of the individual.

2. The computing system of claim 1, wherein the one or more biometric templates are selected based on one or more authentication rules or policies.

3. The computing system of claim 1, wherein the one or more hardware processors are further configured for:

obtaining sensor state information from at least some of the one or more sensors;

using the sensor state information as an input to a scoring model to generate an authentication score indicating whether the MFA kiosk can provide sufficient authentication for the request; and using the authentication score as part of performing multi-factor authentication of the individual.

4. The computing system of claim 3, wherein the scoring model is a trained neural network.

5. The computing system of claim 3, wherein authentication state information and authentication rules are used as additional inputs to the scoring model to generate the authentication score.

6. The computing system of claim 1, wherein the MFA kiosk is an immersive MFA kiosk.

7. The computing system of claim 1, wherein the MFA kiosk is a non-immersive MFA kiosk.

8. The computing system of claim 1, wherein the one or more sensors comprise biometric sensors.

9. The computing system of claim 1, wherein the one or more biometric templates comprise a surgical debris, retina template, and brainwave pattern.

10. A computer-implemented method for multi-factor authentication (MFA) employing an MFA kiosk, the computer-implemented method comprising:

receiving a first plurality of biometric and behavioral data associated with an individual from one or more sensors within or in physical proximity to the MFA kiosk;

constructing a physical profile associated with the individual, wherein the physical profile comprises one or more biometric templates;

storing the physical profile of the individual in a database;

receiving a request to provide authentication for a physical or digital persona of the individual;

receiving, based on the request to provide authentication for the physical or digital persona of the individual, a second plurality of biometric and behavioral data associated with the individual from at least some of the one or more sensors;

comparing the second plurality of biometric and behavioral data with the stored physical profile to identify one or more matching biometric templates to be used to perform multi-factor authentication of the individual; and performing multi-factor authentication of the individual by comparing the second plurality of biometric and behavioral data with one or more of the matching biometric templates to provide authentication for the physical or digital persona of the individual, wherein the multi-factor authentication is based on whether a total authentication score from the second plurality of biometric and behavioral data exceeds a minimum threshold authentication score needed for authentication of the physical or digital persona of the individual.

11. The computer-implemented method of claim 10, wherein the one or more biometric templates are selected based on one or more authentication rules or policies.

12. The computer-implemented method of claim 10, further comprising:

obtaining sensor state information from at least some of the one or more sensors;

using the sensor state information as an input to a scoring model to generate an authentication score indicating whether the MFA kiosk can provide sufficient authentication for the request; and using the authentication score as part of performing multi-factor authentication of the individual.

13. The computer-implemented method of claim 12, wherein the scoring model is a trained neural network.

14. The computer-implemented method of claim 12, wherein authentication state information and authentication rules are used as additional inputs to the scoring model to generate the authentication score.

15. The computer-implemented method of claim 10, wherein the MFA kiosk is an immersive MFA kiosk.

16. The computer-implemented method of claim 10, wherein the MFA kiosk is a non-immersive MFA kiosk.

17. The computer-implemented method of claim 10, wherein the one or more sensors comprise biometric sensors.

18. The computer-implemented method of claim 10, wherein the one or more biometric templates comprise a surgical debris, retina template, and brainwave pattern.

19. A system for multi-factor authentication (MFA) employing an MFA kiosk, comprising one or more computers with executable instructions that, when executed, cause the system to:

receive a first plurality of biometric and behavioral data associated with an individual from one or more sensors within or in physical proximity to the MFA kiosk;

construct a physical profile associated with the individual, wherein the physical profile comprises one or more biometric templates;

store the physical profile of the individual in a database;

receive a request to provide authentication for a physical or digital persona of the individual;

determine a minimum threshold authentication score needed for authentication of the physical or digital persona of the individual;

assign a hierarchical ranking for each type of biometric and behavioral data and assign an authentication score associated with each type of biometric and behavioral data; and perform multi-factor authentication of the individual by comparing a second plurality of biometric and behavioral received based on the request to provide authentication for the physical or digital persona of the individual with one or more of the biometric templates to provide authentication for the physical or digital persona of the individual, wherein the multi-factor authentication is based on whether a total authentication score from the hierarchical ranking for each type of biometric and behavioral data exceeds the minimum threshold authentication score needed for authentication of the physical or digital persona of the individual.

20. The system of claim 19, wherein the one or more biometric templates are selected based on one or more authentication rules or policies.

21. The system of claim 19, wherein the system is further caused to:

obtain sensor state information from at least some of the one or more sensors;

use the sensor state information as an input to a scoring model to generate an authentication score indicating whether the MFA kiosk can provide sufficient authentication for the request; and use the authentication score as part of performing multi-factor authentication of the individual.

22. The system of claim 21, wherein the scoring model is a trained neural network.

23. The system of claim 21, wherein authentication state information and authentication rules are used as additional inputs to the scoring model to generate the authentication score.

24. The system of claim 19, wherein the system is further caused to compare the second plurality of biometric and behavioral data with the stored physical profile to identify one or more matching biometric templates to be used to perform the multi-factor authentication.

25. The system of claim 19, wherein the MFA kiosk is an immersive MFA kiosk.

26. The system of claim 19, wherein the MFA kiosk is a non-immersive MFA kiosk.

27. The system of claim 19, wherein the one or more sensors comprise biometric sensors.

28. The system of claim 19, wherein the one or more biometric templates comprise a surgical debris, retina template, and brainwave pattern.

29. Non-transitory, computer-readable storage media having computer-executable instructions embodied thereon that, when executed by one or more processors of a computing system for multi-factor authentication (MFA) employing an MFA kiosk, cause the computing system to:

receive a first plurality of biometric and behavioral data associated with an individual from one or more sensors within or in physical proximity to the MFA kiosk;

construct a physical profile associated with the individual, wherein the physical profile comprises one or more biometric templates;

store the physical profile of the individual in a database;

receive a request to provide authentication for a physical or digital persona of the individual;

determine a minimum threshold authentication score needed for authentication of the physical or digital persona of the individual;

assign a hierarchical ranking for each type of biometric and behavioral data and assign an authentication score associated with each type of biometric and behavioral data; and perform multi-factor authentication of the individual by comparing a second plurality of biometric and behavioral received based on the request to provide authentication for the physical or digital persona of the individual with one or more of the biometric templates to provide authentication for the physical or digital persona of the individual, wherein the multi-factor authentication is based on whether a total authentication score from the hierarchical ranking for each type of biometric and behavioral data exceeds the minimum threshold authentication score needed for authentication of the physical or digital persona of the individual.

30. The non-transitory, computer-readable storage media of claim 29, wherein the one or more biometric templates are selected based on one or more authentication rules or policies.

31. The non-transitory, computer-readable storage media of claim 29, wherein the computing system is further caused to:

obtain sensor state information from at least some of the one or more sensors;

use the sensor state information as an input to a scoring model to generate an authentication score indicating whether the MFA kiosk can provide sufficient authentication for the request; and use the authentication score as part of performing multi-factor authentication of the individual.

32. The non-transitory, computer-readable storage media of claim 31, wherein the scoring model is a trained neural network.

33. The non-transitory, computer-readable storage media of claim 31, wherein authentication state information and authentication rules are used as additional inputs to the scoring model to generate the authentication score.

34. The non-transitory, computer-readable storage media of claim 29, wherein the computing system is further caused to compare the second plurality of biometric and behavioral data with the stored physical profile to identify one or more matching biometric templates to be used to perform the multi-factor authentication.

35. The non-transitory, computer-readable storage media of claim 29, wherein the MFA kiosk is an immersive MFA kiosk.

36. The non-transitory, computer-readable storage media of claim 29, wherein the MFA kiosk is a non-immersive MFA kiosk.

37. The non-transitory, computer-readable storage media of claim 29, wherein the one or more sensors comprise biometric sensors.

38. The non-transitory, computer-readable storage media of claim 29, wherein the one or more biometric templates comprise a surgical debris, retina template, and brainwave pattern.

* * * * *